United States Patent
Uehara

(10) Patent No.: US 8,804,887 B2
(45) Date of Patent: Aug. 12, 2014

(54) TRANSMISSION AND RECEIVING APPARATUS AND METHOD HAVING DIFFERENT SENDING AND RECEIVING CLOCKS

(75) Inventor: Teruaki Uehara, Kanagawa (JP)

(73) Assignee: LAPIS Semiconductor Co., Ltd., Tokyo (JP)

(*) Notice: Subject to any disclaimer, the term of this patent is extended or adjusted under 35 U.S.C. 154(b) by 773 days.

(21) Appl. No.: 12/898,476

(22) Filed: Oct. 5, 2010

(65) Prior Publication Data

US 2011/0103511 A1   May 5, 2011

(30) Foreign Application Priority Data

Oct. 29, 2009   (JP) .................................. 2009-249194

(51) Int. Cl.
*H04L 7/00* (2006.01)
*H03K 9/00* (2006.01)
*H04L 27/00* (2006.01)

(52) U.S. Cl.
USPC ............................ 375/354; 375/316; 375/295

(58) Field of Classification Search
USPC .................................. 375/295, 360, 316, 354
See application file for complete search history.

(56) References Cited

U.S. PATENT DOCUMENTS

| 7,424,059 | B2 | 9/2008 | Okada | |
| 7,777,536 | B2 | 8/2010 | Yagi | |
| 2005/0220196 | A1 | 10/2005 | Okada | |
| 2007/0046608 | A1* | 3/2007 | Chung | ............................ 345/92 |
| 2009/0153202 | A1 | 6/2009 | Yagi | |
| 2009/0251184 | A1* | 10/2009 | Park | .............................. 327/175 |
| 2010/0134079 | A1* | 6/2010 | Liu et al. | ........................ 323/282 |

FOREIGN PATENT DOCUMENTS

| JP | H03-240336 A | 10/1991 |
| JP | 2000-307556 A | 11/2000 |
| JP | 2001-244920 A | 9/2001 |
| JP | 2005-293353 A | 10/2005 |
| JP | 2009-043195 A | 2/2009 |
| JP | 2009-147869 A | 7/2009 |
| JP | 2008-242527 A | 10/2009 |

OTHER PUBLICATIONS

An Office Action; "Notice of Rejection," issued by the Japanese Patent Office on Sep. 24, 2013, which corresponds to Japanese Patent Application No. 2009-249194 and is related to U.S. Appl. No. 12/898,476; with translation.

* cited by examiner

*Primary Examiner* — Chieh M Fan
*Assistant Examiner* — Brian J Stevens
(74) *Attorney, Agent, or Firm* — Studebaker & Brackett PC

(57) ABSTRACT

A transmission apparatus, a signal sending apparatus, and a signal receiving apparatus, and a transmission method, a signal sending method, and a signal receiving method capable of solving a problem of metastability and suppressing a delay of a signal when sending and receiving apparatuses having different operation clock frequencies send/receive the signal representative of control information, for example. Included are a sending part that operates in synchronization with a first clock having a first period to output a transmission signal having a signal level that is inverted in response to an input of a first pulse signal corresponding to the first period and a receiving part that operates in synchronization with a second clock having a second period to output a second pulse signal corresponding to the second period in response to inversion of a signal level of the transmission signal.

16 Claims, 6 Drawing Sheets

TRANSMISSION AND RECEIVING APPARATUS AND METHOD HAVING DIFFERENT SENDING AND RECEIVING CLOCKS

BACKGROUND OF THE INVENTION

1. Field of the Invention

The present invention relates to a transmission apparatus, a signal sending apparatus, and a signal receiving apparatus, and a transmission method, a signal sending method, and a signal receiving method having a so-called metastability measure.

2. Description of the Related Art

An apparatus such as, for example, a personal computer or a server often employs a configuration with a circuit responsible for general-purpose operations incorporated into a semiconductor chip and a circuit specific to each user incorporated into FPGA (field programmable gate array) such that the apparatus is operated by mutually sending and receiving signals between the semiconductor chip and the FPGA from a cost standpoint.

Such a configuration produces a problem of a signal transmission method between the semiconductor chip and the FPGA. Since the operation clock frequency of the semiconductor chip is typically different from the operation clock frequency of the FPGA, it is problematic that a receiving flip-flop oscillates (a so-called metastable phenomenon occurs) depending on signal acquisition timing on the reception side. That is, if a signal level is changed at the timing of signal acquisition by the receiving flip-flop, it is not determined whether the signal level is high or low, resulting in oscillation of the receiving flip-flop.

A circuit with a few flip-flops connected in series is conventionally used as a so-called metastability measure for preventing this oscillation phenomenon (see, e.g., Japanese Patent Kokai No. 2008-242527). FIG. 1 is a block diagram of a conventional metastability measure circuit 400. The metastability measure circuit 400 consists of a first flip-flop 410 and a second flip-flop 420 mutually connected in series. The first flip-flop 410 acquires in synchronization with a receiving clock RC a signal DI changing in level in synchronization with a sending clock to retain the signal. The second flip-flop 420 acquires the signal level retained by the first flip-flop 410 in synchronization with the receiving clock RC to retain and output the signal level as a signal DO having the signal level retained by the second flip-flop 420. In such a configuration, even when the first flip-flop 410 is in the oscillating state, the second flip-flop 420 stably acquires a signal level after the oscillation has converged. Therefore, the output of the signal DO is stabilized. Such a metastability measure using a few flop-flops is often used in a transmission apparatus for transmitting a control signal.

However, such a conventional metastability measure circuit has the following problems. A first problem is that a control signal pulse is unable to be received correctly on the reception side. The control signal is often sent and received as a pulse with one clock width. In this case, for example, if the frequency of the operation clock on the reception side is lower than the frequency of the operation clock on the transmission side, the control signal pulse cannot be acquired on the reception side, resulting in so-called control signal pulse loss. On the other hand, if the frequency of the operation clock on the transmission side is lower than the frequency of the operation clock on the reception side, one control signal pulse is acquired for a plurality of times on the reception side, leading to the operation same as the case of receiving a plurality of control signal pulses. Therefore, even the usage of the conventional metastability measure circuit cannot solve the problem generated because the operation clock frequencies are different between the transmission side and the reception side.

A second problem is a delay of the control signal. The frequency of the operation clock of FPGA is typically lower than the frequency of the operation clock of a semiconductor chip. If the conventional metastability measure circuit is used when FPGA is on the reception side, a delay of the control signal received by the FPGA increases within the circuit. If the conventional metastability measure circuit is used, a delay of two cycles of the operation clock is generated between reception and output of the control signal by the FPGA. If the frequency of the operation clock of the FPGA is lower, the delay of two cycles is a considerable delay.

SUMMARY OF THE INVENTION

The present invention has been made in view of the problems described above and it is therefore an object of the present invention to provide a transmission apparatus, a signal sending apparatus, a signal receiving apparatus, a transmission method, a signal sending method, and a signal receiving method capable of solving a problem of metastability and suppressing a delay of a signal when sending and receiving apparatuses having different operation clock frequencies send/receive the signal representative of control information, for example.

A transmission apparatus according to the present invention is a transmission apparatus transmitting a signal, comprising a sending part that operates in synchronization with a first clock having a first period to output a transmission signal having a signal level that is inverted in response to an input of a first pulse signal corresponding to the first period; and a receiving part that operates in synchronization with a second clock having a second period to output a second pulse signal corresponding to the second period in response to inversion of a signal level of the transmission signal.

A signal sending apparatus according to the present invention is a signal sending apparatus operating in synchronization with a clock having a predetermined period to output a transmission signal in response to an input of a pulse signal corresponding to the predetermined period, comprising a first signal generating part that inverts a signal level of the transmission signal in synchronization with a rising edge of the clock after the input of the pulse signal; a second signal generating part that inverts a signal level of the transmission signal in synchronization with the input of the pulse signal; and an output selecting part that selects an output of the first signal generating part when the predetermined period is shorter than a period of a receiving clock and selects an output of the second signal generating part when the first period is longer than the period of the receiving clock.

A signal receiving apparatus according to the present invention is a signal receiving apparatus operating in synchronization with a clock having a predetermined period to receive a transmission signal, comprising a first level retaining part that retains a signal level of the transmission signal at a rising edge of the clock as well as at a falling edge of the clock; a first selecting part that selects and outputs one of two signal levels retained by the first level retaining part; a second level retaining part that retains an output of the first selecting part at a rising edge of the clock as well as at a falling edge of the clock; a second selecting part that selects and outputs one of two signal levels retained by the second level retaining part; a preceding level retaining part that retains an output of the second selecting part at a rising edge of the second clock; and an EXOR circuit part that inputs the output of the second selecting part and an output of the preceding level retaining part to generate and output a pulse signal from an exclusive logical sum of the two outputs.

A transmission method according to the present invention is a transmission method of transmitting a signal, comprising a sending step of outputting in synchronization with a first clock having a first period a transmission signal having a signal level that is inverted in response to an input of a first pulse signal corresponding to the first period; and a receiving step of outputting in synchronization with a second clock having a second period a second pulse signal corresponding to the second period in response to inversion of a signal level of the transmission signal.

A signal sending method according to the present invention is a transmission method of outputting in synchronization with a clock having a predetermined period a transmission signal in response to an input of a pulse signal corresponding to the predetermined period, comprising a first signal generating step of inverting a signal level of the transmission signal in synchronization with a rising edge of the clock after the input of the pulse signal; a second signal generating step of inverting a signal level of the transmission signal in synchronization with the input of the pulse signal; and an output selecting step of selecting an output at the first signal generating step when the predetermined period is shorter than a period of a receiving clock and selecting an output at the second signal generating step when the first period is longer than the period of the receiving clock.

A signal receiving method according to the present invention is a transmission method of receiving a transmission signal in synchronization with a clock having a predetermined period, comprising a first level retaining step of retaining a signal level of the transmission signal at a rising edge of the clock as well as at a falling edge of the clock; a first selecting step of selecting one of two signal levels retained at the first level retaining step; a second level retaining step of retaining an output at the first selecting step at a rising edge of the clock as well as at a falling edge of the clock; a second selecting step of selecting and outputting one of two signal levels retained at the second level retaining step; a preceding level retaining step of retaining an output at the second selecting step at a rising edge of the second clock; and an EXOR step of inputting the output at the second selecting step and an output of the preceding level retaining step to generate and output a pulse signal from an exclusive logical sum of the two outputs.

According to a transmission apparatus, a signal sending apparatus, and a signal receiving apparatus, and a transmission method, a signal sending method, and a signal receiving method of the present invention, when sending and receiving apparatuses having different operation clock frequencies send/receive a control signal, a problem of metastability can be solved and a delay of the control signal can be suppressed.

DESCRIPTION OF THE PREFERRED EMBODIMENTS

Exemplary embodiments of the present invention will now be described with reference to the accompanying drawings.

Figure 1:
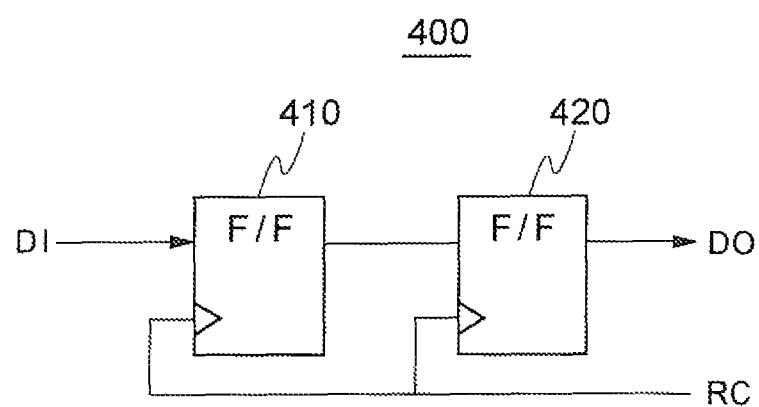
FIG. 1 is a block diagram of a conventional metastability measure circuit.
Figure 2:
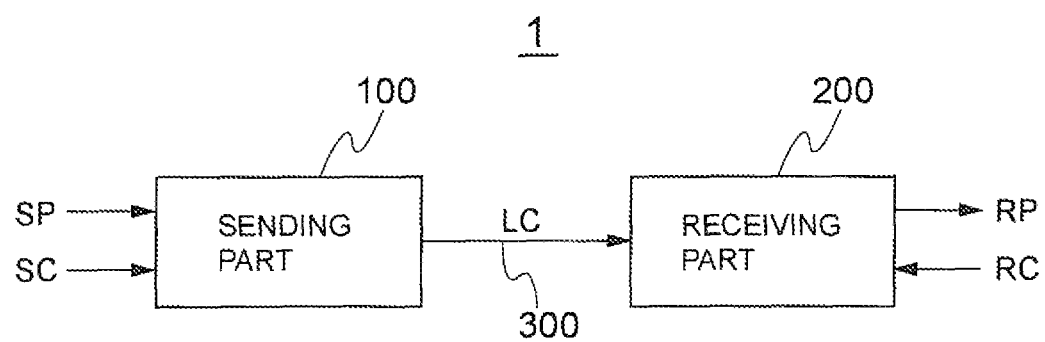
FIG. 2 is a block diagram of a transmission apparatus that is an embodiment of the present invention.

FIG. 2 is a block diagram of a transmission apparatus 1 of an embodiment. The transmission apparatus 1 includes a sending part 100 and a receiving part 200. The transmission apparatus 1 is mounted on a single printed circuit board or module printed circuit board (not depicted) included in an apparatus such as a personal computer or a server, for example, and sends a transmission signal LC from the sending part 100 to the receiving part 200 via a transmission path 300 consisting of conductive wiring made of, for example, copper formed in the printed circuit board. The sending part 100 and the receiving part 200 may be mounted as a signal sending apparatus 100 and a signal receiving apparatus 200 on their respective module circuit boards (not depicted).

The sending part 100 operates in synchronization with a sending clock SC (first clock) having a first period and the receiving part 200 operates in synchronization with a receiving clock RC (second clock) having a second period. The frequency of the sending clock SC is different from the frequency of the receiving clock RC. The frequency of the sending clock SC may be higher or lower than the frequency of the receiving clock RC. These frequencies have no limitations. For example, the frequency of the sending clock SC may be 100 MHz and the frequency of the receiving clock RC may be 50 MHz. An example of the case of transmitting control information will hereinafter be described.

The sending part 100 is a sending circuit formed within, for example, a semiconductor chip operating in synchronization with the sending clock SC. The sending part 100 accepts an input of a sending control signal SP that is a first pulse signal carrying the control information, for example, and sends to the receiving part 200 a transmission signal LC having a signal level that is inverted in response to the pulse input of the sending control signal SP. The inversion of the signal level is inversion between low and high. The pulse width of the sending control signal SP is a width corresponding to the period of the sending clock SC (first period).

Figure 3:
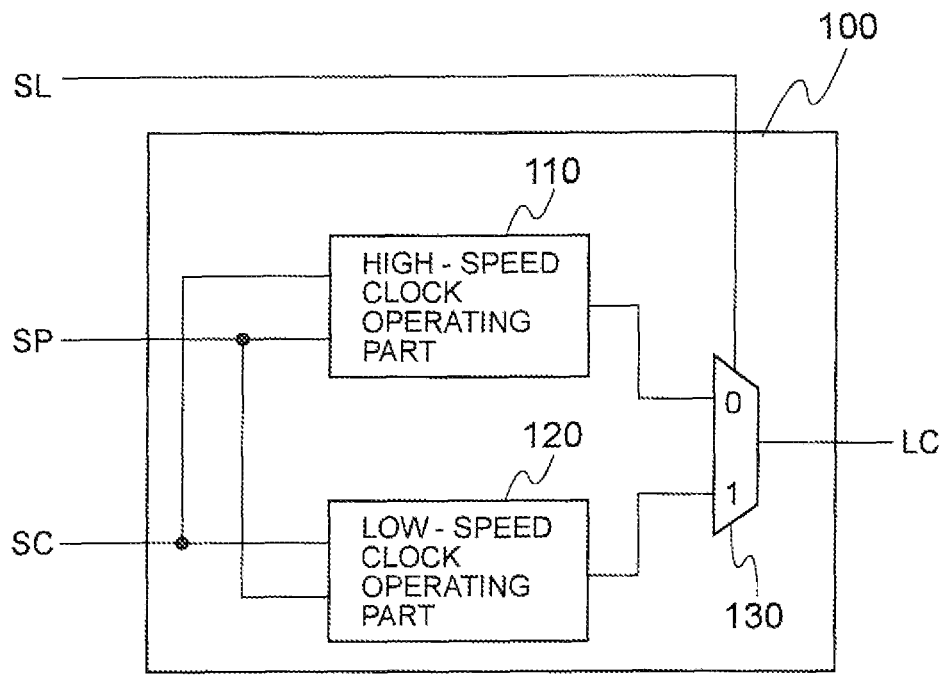
FIG. 3 is a block diagram of a sending part in the transmission apparatus of FIG. 2.

FIG. 3 is a block diagram of the sending part 100. The sending part 100 includes a high-speed clock operating part 110, a low-speed clock operating part 120, and an output selecting part 130.

The high-speed clock operating part (first signal generating part) 110 is a sending circuit preferable when the frequency of the sending clock SC is higher than a predetermined frequency. The low-speed clock operating part (second signal generating part) 120 is a sending circuit preferable when the frequency of the sending clock SC is lower than a predetermined frequency. The predetermined frequency is determined based on a delay amount of devices making up a circuit, etc. Each of the high-speed clock operating part 110 and the low-speed clock operating part 120 accepts an input of the sending control signal SP and operates in synchronization with the sending clock SC.

The output selecting part 130 is a selector that selects either a transmission signal LCF generated by the high-speed clock operating part 110 or a transmission signal LCS generated by the low-speed clock operating part 120 depending on a selector signal SL that is external input to output the selected signal as the transmission signal LC. The output selecting part 130 selects either the transmission signal LCF or LCS depending on an external input selection signal from an external terminal disposed on the printed circuit board equipped with the transmission apparatus 1, for example.

Figure 4:
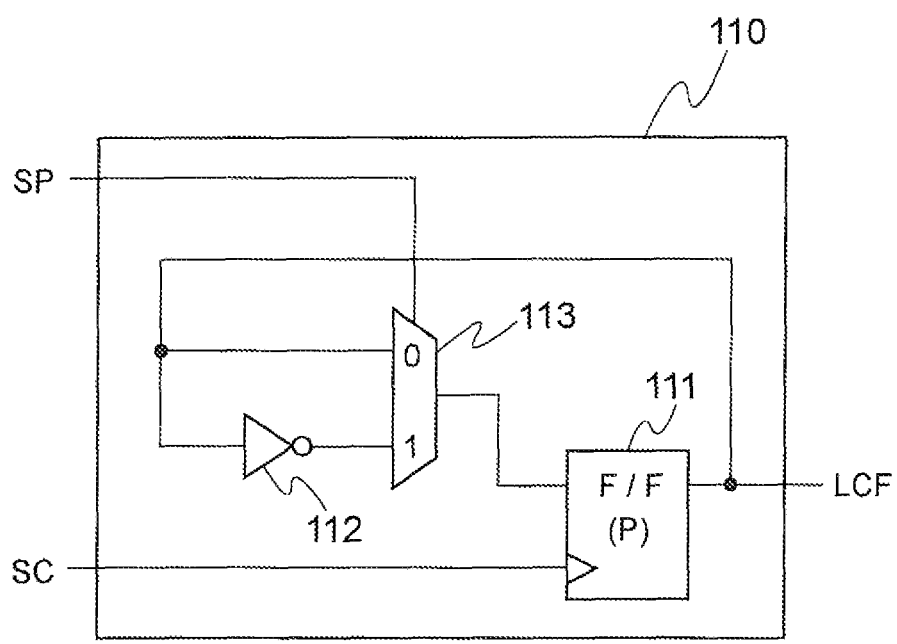
FIG. 4 is a block diagram of a high-speed clock operating part in the sending part of FIG. 3.

FIG. 4 is a block diagram of the high-speed clock operating part 110. The high-speed clock operating part 110 includes a first sending flip-flop 111, a first sending inverter 112, and a first sending selector 113. In the description of flip-flops in the drawings herein, (P) and (N) will hereinafter indicate a type of a flip-flop operating at a rising edge and a type of a flip-flop operating at a falling edge, respectively.

The first sending flip-flop 111 acquires a signal level selected by the first sending selector 113 in synchronization with the sending clock SC and retains the signal level as a retained signal level. The first sending flip-flop 111 outputs a level signal having the retained signal level as the transmission signal LCF.

The first sending inverter 112 generates and supplies to the first sending selector 113 an inverted signal level of the retained signal level retained by the first sending flip-flop 111.

The first sending selector 113 selects and supplies to the first sending flip-flop 111 either the retained signal level retained by the first sending flip-flop 111 or the inverted signal level of the retained signal level depending on the signal level of the sending control signal SP.

Figure 5:
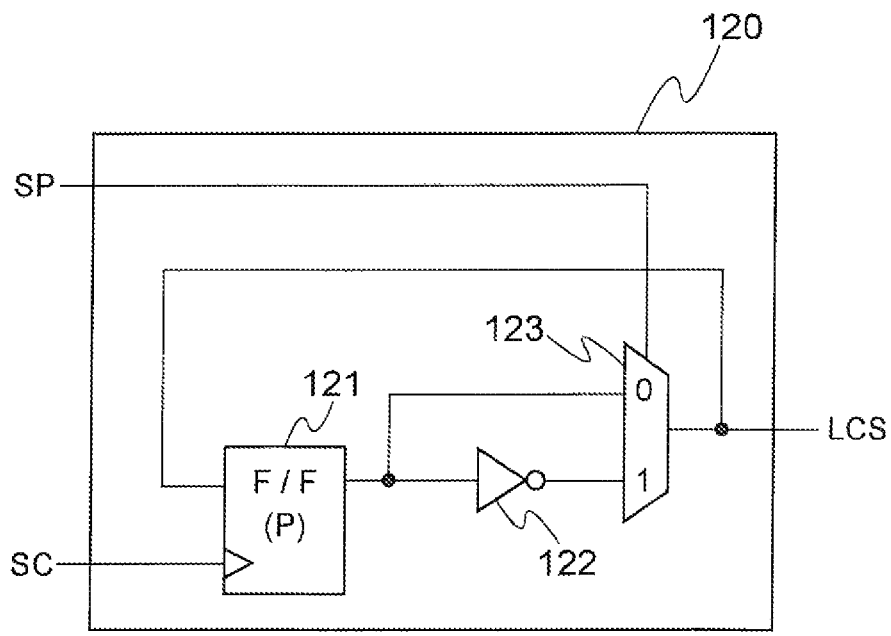
FIG. 5 is a block diagram of a low-speed clock operating part in the sending part of FIG. 3.

FIG. 5 is a block diagram of the low-speed clock operating part 120. The low-speed clock operating part 120 includes a second sending flip-flop 121, a second sending inverter 122, and a second sending selector 123.

The second sending flip-flop 121 acquires a signal level selected by the second sending selector 123 and retains the signal level as a retained signal level. The second sending flip-flop 121 outputs the retained signal level in synchronization with the sending clock SC.

The second sending inverter 122 generates and supplies to the second sending selector 123 an inverted signal level of the retained signal level retained by the second sending flip-flop 121.

The second sending selector 123 receives inputs of the retained signal level retained by the second sending flip-flop 121 and the inverted signal level generated by the second sending inverter 122 to select one of the two inputs depending on the signal level of the sending control signal SP. The second sending selector 123 outputs a level signal having the selected signal level as the transmission signal LCS.

Each of the first sending flip-flop 111 and the second sending flip-flop 121 acquires the signal level at the rising edge of the sending clock SC.

Figure 6:
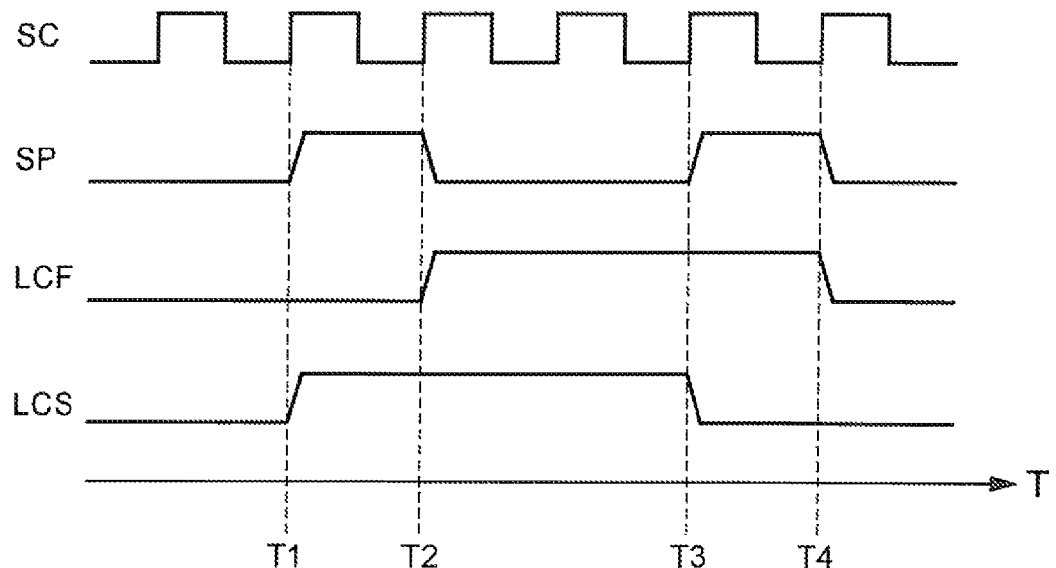
FIG. 6 is a time chart of operating waveforms in the sending part.

FIG. 6 is a time chart of operating waveforms in the sending part 100. In FIG. 6, the transmission signal LC output by the high-speed clock operating part 110 is represented as the transmission signal LCF and the transmission signal LC output by the low-speed clock operating part 120 is represented as the transmission signal LCS.

The sending clock SC is a signal that alternately goes high and low in a repeated manner. In the sending control signal SP input to the sending part 100, a pulse of one cycle width intermittently appears (in portions of time T1 to T2 and time T3 to T4). Both the first sending selector 113 of the high-speed clock operating part 110 and the second sending selector 123 of the low-speed clock operating part 120 select the inverted signal level only when the pulse is input.

Since the first sending flip-flop 111 temporarily retains the inverted signal level selected when the pulse is input and outputs the retained inverted signal level at the next cycle in the high-speed clock operating part 110, the signal level of the transmission signal LCF is switched at the falling edge portions of the pulse (at times T2 and T4). The first sending flip-flop 111 retains the inverted signal level until the next pulse is input. The first sending flip-flop 111 consequently continues the output of the transmission signal LCS of the same signal level until the falling edge portion of the next pulse. In this way, the high-speed clock operating part 110 inverts the signal level of the transmission signal LC in synchronization with the rising edge of the sending clock SC after the input of the pulse signal of the sending control signal SP.

Since the second sending selector 123 outputs the inverted signal level selected when the pulse is input in the low-speed clock operating part 120, the signal level of the transmission signal LCS is switched at the rising edge portions of the pulse (at times T1 and T3). The second sending flip-flop 121 retains the inverted signal level until the next pulse is input. The second sending selector 123 consequently continues the output of the transmission signal LCS of the same signal level until the next pulse is input. In this way, the low-speed clock operating part 120 inverts the signal level of the transmission signal LC in synchronization with the input of the pulse of the sending control signal SP.

In this way, each of the high-speed clock operating part 110 and the low-speed clock operating part 120 generates and outputs as the transmission signal LC a signal acquired by changing the signal level each time the pulse of the sending control signal SP is input. In other words, each of the high-speed clock operating part 110 and the low-speed clock operating part 120 is a circuit that converts the sending control signal SP, which is a pulse signal, into a level signal represented by changes in signal level.

Figure 7:
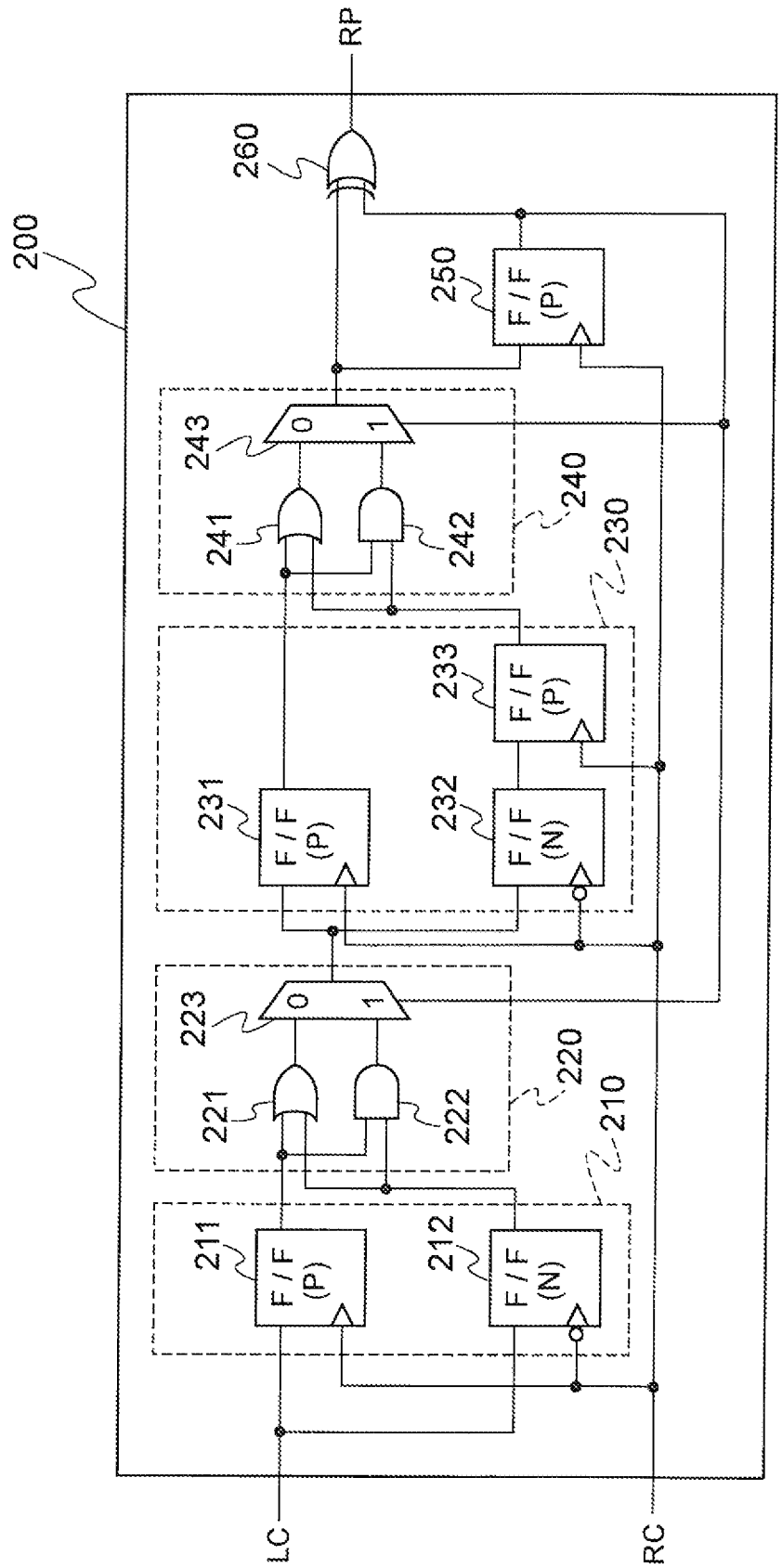
FIG. 7 is a block diagram of a receiving part in the transmission apparatus of FIG. 2.

FIG. 7 is a block diagram of the receiving part 200. The receiving part 200 is a receiving circuit incorporated into, for example, FPGA (field programmable gate array) operating in synchronization with the receiving clock RC. The receiving part 200 receives the transmission signal LC that is a level signal from the sending part 100 and generates and outputs a receiving control signal RP that is a second pulse signal corresponding to the period of the receiving clock RC (second period) depending on the inversion of the signal level of the transmission signal LC. The inversion of the signal level is inversion between low and high. The receiving control signal RP is a signal carrying the same control information as the control information carried by the sending control signal SP, for example.

The receiving part includes a first level retaining part 210, a first selecting part 220, a second level retaining part 230, a second selecting part 240, a preceding level retaining part 250, and an EXOR circuit 260. A functional block consisting of the first level retaining part 210, the first selecting part 220, the second level retaining part 230, and the second selecting part 240 will hereinafter be referred to as a relaying part. The relaying part is a metastability measure circuit that suppresses circuit oscillations at the time of reception of the transmission signal LC. A functional block consisting of the preceding level retaining part 250 and the EXOR circuit 260 will be referred to as a third signal generating part.

The first level retaining part 210 sequentially acquires and retains the signal level of the transmission signal LC at the rising edge and the falling edge of the receiving clock RC.

The first level retaining part 210 includes a first up-edge flip-flop 211 and a first down-edge flip-flop 212. The first up-edge flip-flop 211 is a flip-flop that sequentially acquires and retains the signal level of the transmission signal LC at the rising edge (up edge) of the receiving clock RC. The first down-edge flip-flop 212 is a flip-flop that sequentially acquires and retains the signal level of the transmission signal LC at the falling edge (down edge) of the receiving clock RC.

The first selecting part 220 includes a first OR circuit 221, a first AND circuit 222, and a first selector 223.

The first OR circuit 221 is an OR circuit that sequentially outputs a logical sum of two signal levels retained by the first level retaining part 210. The first AND circuit 222 is an AND circuit that sequentially outputs a logical product of two signal levels retained by the first level retaining part 210. The two signal levels are the signal level retained by the first up-edge flip-flop 211 and the signal level retained by the first down-edge flip-flop 212.

The first selector 223 is a selector that sequentially and alternatively selects either an output of the first OR circuit 221 or an output of the first AND circuit 222 depending on a signal level retained by the preceding level retaining part 250 (hereinafter, a preceding level).

The second level retaining part 230 includes a second up-edge flip-flop 231, a second down-edge flip-flop 232, and an edge adjustment flip-flop 233.

The second up-edge flip-flop 231 is a flip-flop that sequentially acquires and retains the signal level selected by the first selecting part 220 at the rising edge of the receiving clock RC. The second down-edge flip-flop 232 is a flip-flop that sequentially acquires and retains the signal level selected by the first selecting part 220 at the falling edge of the receiving clock RC. The edge adjustment flip-flop 233 is a flip-flop that sequentially acquires and retains the signal level retained by the second down-edge flip-flop 232 at the rising edge of the receiving clock RC.

The second selecting part 240 includes a second OR circuit 241, a second AND circuit 242, and a second selector 243.

The second OR circuit 241 is an OR circuit that sequentially outputs a logical sum of two signal levels retained by the second level retaining part 230. The second AND circuit 242 is an AND circuit that sequentially outputs a logical product of two signal levels retained by the second level retaining part 230. The two signal levels are the signal level retained by the second up-edge flip-flop 231 and the signal level retained by the edge adjustment flip-flop 233.

The second selector 243 is a selector that sequentially and alternatively selects either an output of the second OR circuit 241 or an output of the second AND circuit 242 depending on the preceding level retained by the preceding level retaining part 250.

The preceding level retaining part 250 is a flip-flop that sequentially acquires a signal level selected by the second selecting part 240 in synchronization with the receiving clock RC to retain the signal level as the preceding level. The preceding level is either high or low. The preceding level retaining part 250 sequentially outputs the preceding level in synchronization with the receiving clock RC. The preceding level retaining part 250 will hereinafter also simply be referred to as a retaining part 250.

The EXOR circuit 260 receives the signal level from the second selecting part 240 as one input and the preceding level retained by the preceding level retaining part 250 as the other input to output the receiving control signal RP of the signal level obtained from an exclusive logical sum of the both signal levels.

The above process in the receiving part 200 is repeated in synchronization with the receiving clock RC. In this way, the receiving part 200 alternatively relays one of the signal levels of the transmission signals acquired at the up edge and the down edge depending on the preceding level of the transmission signal and generates the receiving control signal RP corresponding to one cycle of the receiving clock based on the relayed signal level while taking the metastability measures by the two-stage retaining part consisting of the first level retaining part 210 and the second level retaining part 230.

Figure 8:
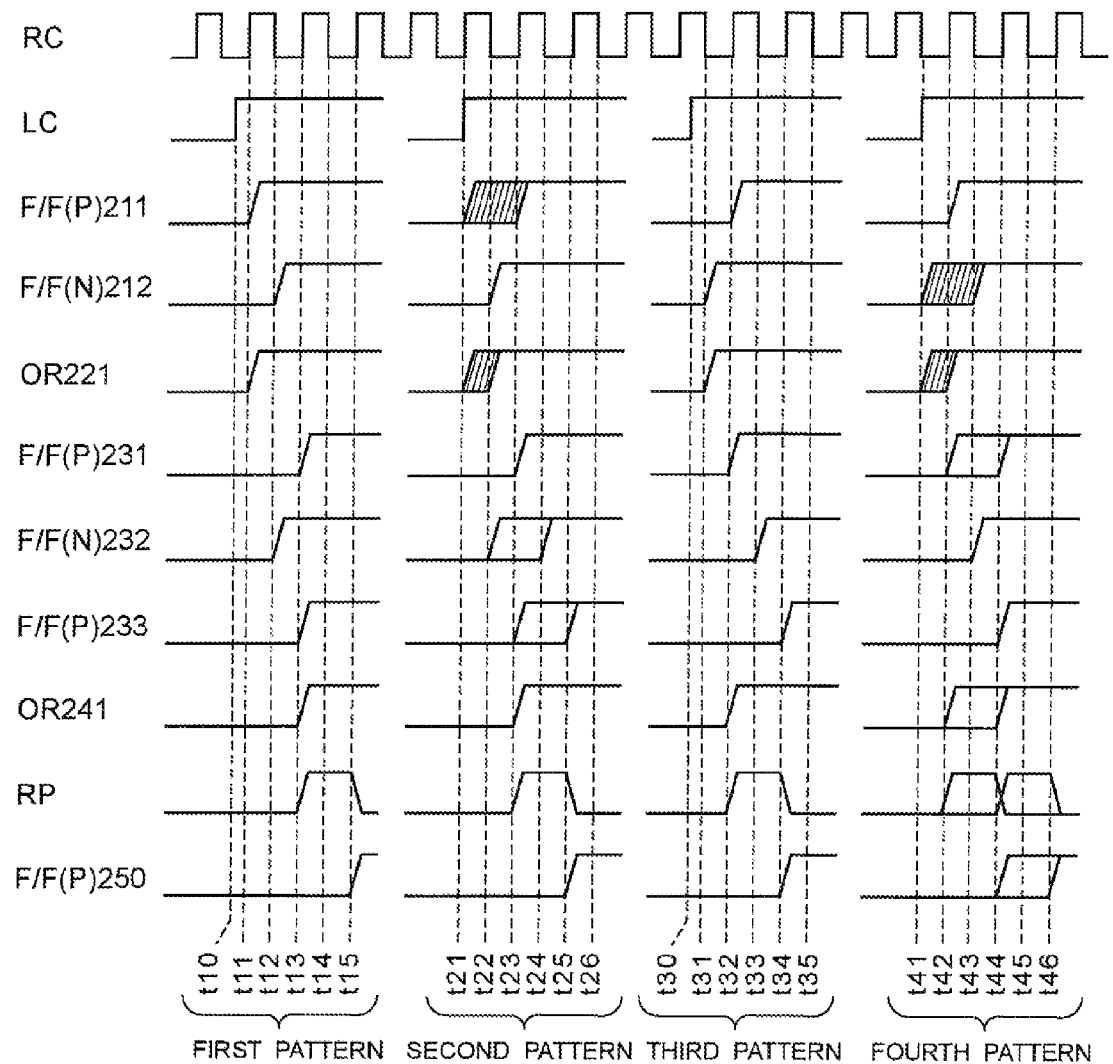
FIG. 8 is a time chart of operating waveforms in the receiving part when a control signal from the sending part changes in level from low to high.

FIG. 8 is a time chart of operating waveforms in the receiving part 200 when the level of the transmission signal LC from the sending part 100 is inverted from low to high. FIG. 8 depicts four patterns (first to fourth patterns) of waveforms having phase differences between the receiving clock signal RC and the transmission signal LC different from each other. In each of the first to fourth patterns, the frequency of the receiving clock signal RC may be lower or higher than the frequency of the sending clock signal SC.

The first pattern indicates the waveforms when the level of the transmission signal LC is inverted from low to high at a time t10 that is earlier than a rising edge time t11 of the receiving clock signal RC. In this case, the first up-edge flip-flop 211 (F/F(P) 211) acquires and retains the high-level transmission signal LC at the rising edge time t11 of the receiving clock signal RC. The first down-edge flip-flop 212 (F/F(N) 212) acquires and retains the high-level transmission signal LC at a falling edge time t12 of the receiving clock signal RC.

The preceding level retaining part 250 retains a low-level signal, i.e., the signal level before the time t10 when the transmission signal LC changes in level to high, as the preceding level, which is supplied to the first selector 223. The first selector 223 selects the output of the first OR circuit 221 depending on the low-level signal.

The first OR circuit 221 (OR 221) receives the signal level retained by the first up-edge flip-flop 211 as one input and the signal level retained by the first down-edge flip-flop 212 as the other input to output a logical sum of the both signal levels. The first OR circuit 221 outputs a high-level signal from the earlier acquisition time t11 of the times t11 and t12 when the both flip-flops acquire the high-level signals. The first selector 223 supplies the high-level signal to the second up-edge flip-flop 231 and the second down-edge flip-flop 232.

The second up-edge flip-flop 231 (F/F(P) 231) acquires and retains the high-level signal from the first selector 223 at a rising edge time t13 of the receiving clock signal RC. The second down-edge flip-flop 232 (F/F(N) 232) acquires and retains the high-level signal from the first selector 223 at the falling edge time t12 of the receiving clock signal RC. The edge adjustment flip-flop 233 (F/F(P) 233) acquires and retains the high-level signal from the second down-edge flip-flop 232 at the rising edge time t13 of the receiving clock signal RC.

The preceding level retaining part 250 retains a low-level signal, i.e., the signal level before the time t10 when the transmission signal LC changes in level to high, as the preceding level, which is supplied to the second selector 243. The second selector 243 selects the output of the second OR circuit 241 depending on the low-level signal.

The second OR circuit 241 (OR 241) receives the signal level retained by the second up-edge flip-flop 231 as one input and the signal level retained by the edge adjustment flip-flop 233 as the other input to output a logical sum of the both signal levels. The second OR circuit 241 outputs a high-level signal from the time t13 when the both flip-flops acquire the high-level signal. The second selector 243 supplies the high-level signal to the preceding level retaining flip-flop 250 and the EXOR circuit 260.

The preceding level retaining flip-flop 250 acquires and retains the high-level signal at a rising edge time t15 of the receiving clock signal RC. The preceding level retaining flip-flop 250 supplies a low-level signal to the EXOR circuit 260 until the time t15 and supplies the high-level signal as the preceding level to the EXOR circuit 260 after the time t15.

As a result, the signal level (high) from the second OR circuit 241 is different from the signal level (low) from the preceding level retaining flip-flop 250 only between the times t13 and t15. Therefore, the EXOR circuit 260 generates and outputs the receiving control signal RP having a signal level set to high only between the times t13 and t15. The period between the times t13 and t15 is a period corresponding to one cycle of the receiving clock signal RC.

As a result, a period within 1.5 cycles of the receiving clock signal RC elapses after the time t10 when the receiving part 200 receives the transmission signal LC from the sending part 100 until the time t13 when the receiving part 200 starts output of the receiving control signal RP.

The second pattern indicates the waveforms when a time t21 of the level inversion of the transmission signal LC from low to high is identical or substantially identical to the rising edge time t21 of the receiving clock signal RC. Although the first up-edge flip-flop 211 (F/F(P) 211) attempts to acquire and retain the high-level transmission signal LC at the rising edge time t21 of the receiving clock signal RC in this case, an oscillation phenomenon occurs since the acquisition timing overlaps the timing of the level change. Shaded portions of FIG. 8 indicate the period while the oscillation phenomenon occurs (times t21 to t23). On the other hand, the first down-edge flip-flop 212 (F/F(N) 212) acquires and retains the high-level transmission signal LC at the falling edge time t22 of the receiving clock signal RC.

The first selector 223 selects the output of the first OR circuit 221 depending on the low-level signal from the preceding level retaining part 250 as is the case with the first pattern. The first OR circuit 221 (OR 221) receives the signal level retained by the first up-edge flip-flop 211 or the signal level of the oscillation state as one input and the signal level retained by the first down-edge flip-flop 212 as the other input to output a logical sum of the both signal levels. The first OR circuit 221 outputs a high-level signal by the time t22 at the latest. The first selector 223 supplies the high-level signal to the second up-edge flip-flop 231 and the second down-edge flip-flop 232.

The second up-edge flip-flop 231 (F/F(P) 231) acquires and retains the high-level signal from the first selector 223 at the rising edge time t23 of the receiving clock signal RC. The second down-edge flip-flop 232 (F/F(N) 232) acquires and retains the high-level signal from the first selector 223 at the falling edge time t22 or t24 of the receiving clock signal RC. The edge adjustment flip-flop 233 (F/F(P) 233) acquires and retains the high-level signal from the second down-edge flip-flop 232 at the rising edge time t23 or t25 of the receiving clock signal RC.

The second selector 243 selects the output of the second OR circuit 241 depending on the low-level signal from the preceding level retaining part 250 as is the case with the first pattern. The second OR circuit 241 (OR 241) receives the signal level retained by the second up-edge flip-flop 231 as one input and the signal level retained by the edge adjustment flip-flop 233 as the other input to output a logical sum of the both signal levels. The second OR circuit 241 outputs a high-level signal from the earlier acquisition time t23 of the times t23 and t25 when the both flip-flops acquire the high-level signals. The second selector 243 supplies the high-level signal to the preceding level retaining flip-flop 250 and the EXOR circuit 260.

The preceding level retaining flip-flop 250 acquires and retains the high-level signal at a rising edge time t25 of the receiving clock signal RC. The preceding level retaining flip-flop 250 supplies a low-level signal to the EXOR circuit 260 until the time t25 and supplies the high-level signal to the EXOR circuit 260 after the time t25.

As a result, the signal level (high) from the second OR circuit 241 is different from the signal level (low) from the preceding level retaining flip-flop 250 only between the times t23 and t25. Therefore, the EXOR circuit 260 generates and outputs the receiving control signal RP having a signal level set to high only between the times t23 and t25. The period between the times t23 and t25 is a period corresponding to one cycle of the receiving clock signal RC.

As a result, a period within one cycle of the receiving clock signal RC elapses after the time t21 when the receiving part 200 receives the transmission signal LC from the sending part 100 until the time t23 when the receiving part 200 starts output of the receiving control signal RP.

The third pattern indicates the waveforms when the level of the transmission signal LC is inverted from low to high at a time t30 that is earlier than a falling edge time t31 of the receiving clock signal RC. In this case, the first up-edge flip-flop 211 (F/F(P) 211) acquires and retains the high-level transmission signal LC at a rising edge time t32 of the receiving clock signal RC. The first down-edge flip-flop 212 (F/F(N) 212) acquires and retains the high-level transmission signal LC at the falling edge time t31 of the receiving clock signal RC.

The first selector 223 selects the output of the first OR circuit 221 depending on the low-level signal from the preceding level retaining part 250 as is the case with the first pattern. The first OR circuit 221 (OR 221) receives the signal level retained by the first up-edge flip-flop 211 as one input and the signal level retained by the first down-edge flip-flop 212 as the other input to output a logical sum of the both signal levels. The first OR circuit 221 outputs a high-level signal at the earlier acquisition time t31 of the times t31 and t32 when the both flip-flops acquire the high-level signals. The first selector 223 supplies the high-level signal to the second up-edge flip-flop 231 and the second down-edge flip-flop 232.

The second up-edge flip-flop 231 (F/F(P) 231) acquires and retains the high-level signal from the first selector 223 at the rising edge time t32 of the receiving clock signal RC. The second down-edge flip-flop 232 (F/F(N) 232) acquires and retains the high-level signal from the first selector 223 at a falling edge time t33 of the receiving clock signal RC. The edge adjustment flip-flop 233 (F/F(P) 233) acquires and retains the high-level signal from the second down-edge flip-flop 232 at a rising edge time t34 of the receiving clock signal RC.

The second selector 243 selects the output of the second OR circuit 241 depending on the low-level signal from the preceding level retaining part 250 as is the case with the first pattern. The second OR circuit 241 (OR 241) receives the signal level retained by the second up-edge flip-flop 231 as one input and the signal level retained by the edge adjustment flip-flop 233 as the other input to output a logical sum of the both signal levels. The second OR circuit 241 outputs a high-level signal from the earlier acquisition time t32 of the times t32 and t34 when the both flip-flops acquire the high-level signals. The second selector 243 supplies the high-level signal to the preceding level retaining flip-flop 250 and the EXOR circuit 260.

The preceding level retaining flip-flop 250 acquires and retains the high-level signal at the rising edge time t34 of the receiving clock signal RC. The preceding level retaining flip-flop 250 supplies the low-level signal to the EXOR circuit 260 until the time t34 and supplies the high-level signal to the EXOR circuit 260 after the time t34.

As a result, the signal level (high) from the second OR circuit 241 is different from the signal level (low) from the preceding level retaining flip-flop 250 only between the times t32 and t34. Therefore, the EXOR circuit 260 generates and outputs the receiving control signal RP having a signal level set to high only between the times t32 and t34. The period between the times t32 and t34 is a period corresponding to one cycle of the receiving clock signal RC.

As a result, a period within one cycle of the receiving clock signal RC elapses after the time t30 when the receiving part 200 receives the transmission signal LC from the sending part 100 until the time t32 when the receiving part 200 starts output of the receiving control signal RP.

The fourth pattern indicates the waveforms when a time t41 of the level inversion of the transmission signal LC from low to high is identical or substantially identical to the falling edge time t41 of the receiving clock signal RC. In this case, the first up-edge flip-flop 211 (F/F(P) 211) acquires and retains the high-level transmission signal LC at a rising edge time t42 of the receiving clock signal RC. On the other hand, although the first down-edge flip-flop 212 (F/F(N) 212) attempts to acquire and retain the high-level transmission signal LC at the rising edge time t41 of the receiving clock signal RC, an oscillation phenomenon occurs since the acquisition timing overlaps the timing of the level change. Shaded portions of FIG. 8 indicate the period while the oscillation phenomenon occurs (times t41 to t43).

The first selector 223 selects the output of the first OR circuit 221 depending on the low-level signal from the preceding level retaining part 250 as is the case with the first pattern. The first OR circuit 221 (OR 221) receives the signal level retained by the first up-edge flip-flop 211 as one input and the signal level retained by the first down-edge flip-flop 212 or the signal level of the oscillation state as the other input to output a logical sum of the both signal levels. The first OR circuit 221 outputs a high-level signal by the time t42 at the latest. The first selector 223 supplies the high-level signal to the second up-edge flip-flop 231 and the second down-edge flip-flop 232.

The second up-edge flip-flop 231 (F/F(P) 231) acquires and retains the high-level signal from the first selector 223 at the rising edge time 42 or t44 of the receiving clock signal RC. The second down-edge flip-flop 232 (F/F(N) 232) acquires and retains the high-level signal from the first selector 223 at the falling edge time t43 of the receiving clock signal RC. The edge adjustment flip-flop 233 (F/F(P) 233) acquires and retains the high-level signal from the second down-edge flip-flop 232 at the rising edge time t44 of the receiving clock signal RC.

The second selector 243 selects the output of the second OR circuit 241 depending on the low-level signal from the preceding level retaining part 250 as is the case with the first pattern. The second OR circuit 241 (OR 241) receives the signal level retained by the second up-edge flip-flop 231 as one input and the signal level retained by the edge adjustment flip-flop 233 as the other input to output a logical sum of the both signal levels. The second OR circuit 241 outputs a high-level signal from the time t42 or t44 when the both flip-flops acquire the high-level signals. The second selector 243 supplies the high-level signal to the preceding level retaining flip-flop 250 and the EXOR circuit 260.

The preceding level retaining flip-flop 250 acquires and retains the high-level signal at the rising edge time t44 or t46 of the receiving clock signal RC. The preceding level retaining flip-flop 250 supplies a low-level signal to the EXOR circuit 260 until the time t44 or t46 and supplies the high-level signal to the EXOR circuit 260 after the time t44 or t46.

As a result, the signal level (low or high) from the second OR circuit 241 is different from the signal level (high or low) from the preceding level retaining flip-flop 250 only between the times t42 and t44 or the times t44 and t46. Therefore, the EXOR circuit 260 generates and outputs the receiving control signal RP having a signal level set to high only between the times t42 and t44 or the times t44 and t46. The period between the times t42 and t44 or the times t44 and t46 is a period corresponding to one cycle of the receiving clock signal RC.

As a result, a period within 0.5 or 1.5 cycles of the receiving clock signal RC elapses after the time t41 when the receiving part 200 receives the transmission signal LC from the sending part 100 until the time t42 of t44 when the receiving part 200 starts output of the receiving control signal RP.

Figure 9:
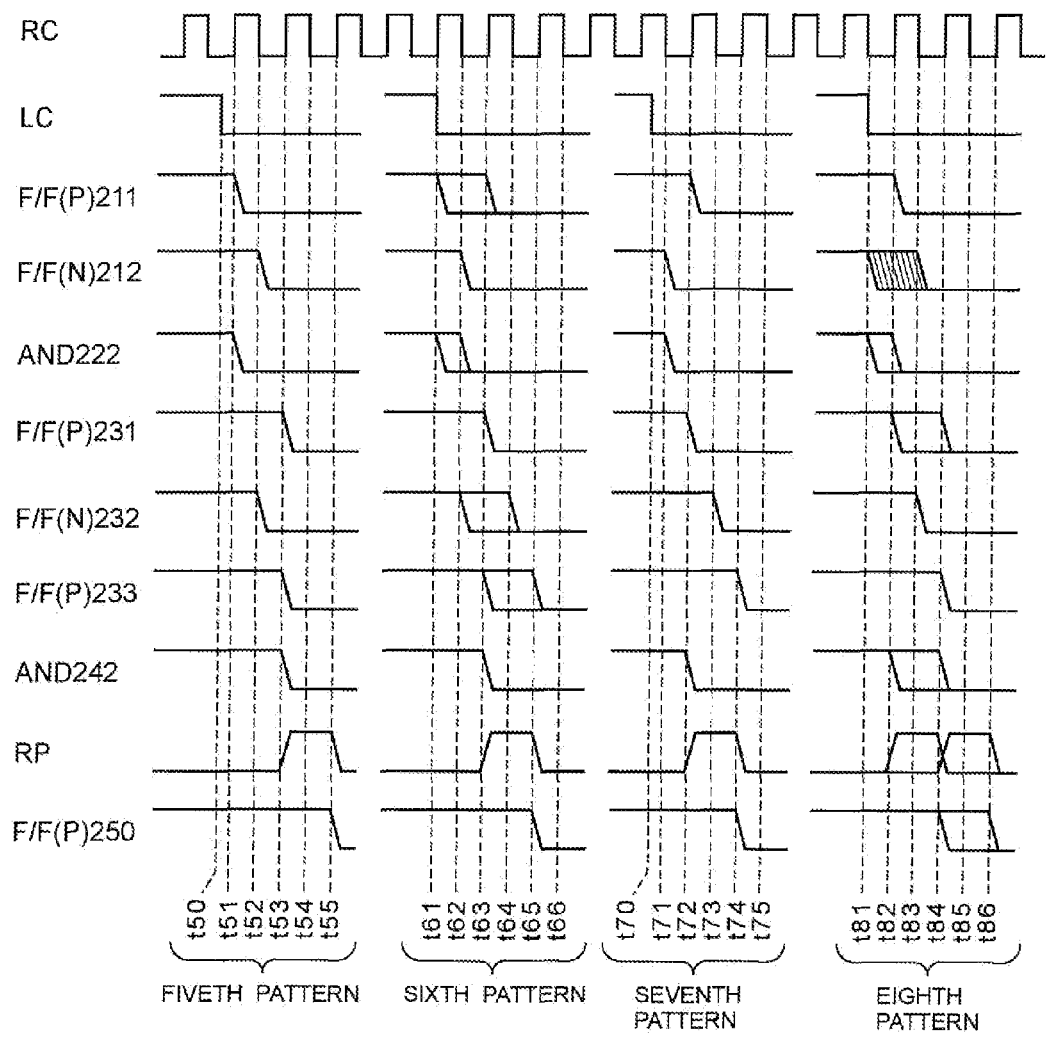
FIG. 9 is a time chart of operating waveforms in the receiving part when the control signal from the sending part changes in level from high to low.

FIG. 9 is a time chart of operating waveforms in the receiving part 200 when the level of the transmission signal LC from the sending part 100 is inverted from high to low. FIG. 9 depicts four patterns (fifth to eighth patterns) of waveforms having phase differences between the receiving clock signal RC and the transmission signal LC different from each other. In each of the fifth to eighth patterns, the frequency of the receiving clock signal RC may be lower or higher than the frequency of the sending clock signal SC.

The fifth pattern indicates the waveforms when the transmission signal LC is inverted in level from high to low at a time t50 that is earlier than a rising edge time t51 of the receiving clock signal RC. In this case, the first up-edge flip-flop 211 (F/F(P) 211) acquires and retains the low-level transmission signal LC at the rising edge time t51 of the receiving clock signal RC. The first down-edge flip-flop 212 (F/F(N) 212) acquires and retains the low-level transmission signal LC at a falling edge time t52 of the receiving clock signal RC.

The preceding level retaining part 250 retains a high-level signal, i.e., the signal before the time t50 when the transmission signal LC changes in level to low and supplies the signal to the first selector 223. The first selector 223 selects the output of the first AND circuit 222 depending on the high-level signal.

The first AND circuit 222 (AND 222) receives the signal level retained by the first up-edge flip-flop 211 as one input and the signal level retained by the first down-edge flip-flop 212 as the other input to output a logical product of the both signal levels. The first AND circuit 222 outputs a low-level signal from the earlier acquisition time t51 of the times t51 and t52 when the both flip-flops acquire the low-level signals. The first selector 223 supplies the low-level signal to the second up-edge flip-flop 231 and the second down-edge flip-flop 232.

The second up-edge flip-flop 231 (F/F(P) 231) acquires and retains the low-level signal from the first selector 223 at a rising edge time t53 of the receiving clock signal RC. The second down-edge flip-flop 232 (F/F(N) 232) acquires and retains the low-level signal from the first selector 223 at the falling edge time t52 of the receiving clock signal RC. The edge adjustment flip-flop 233 (F/F(P) 233) acquires and retains the low-level signal from the second down-edge flip-flop 232 at the rising edge time t53 of the receiving clock signal RC.

The preceding level retaining part 250 retains a high-level signal, i.e., the signal before the time t50 when the transmission signal LC changes in level to low and supplies the signal to the second selector 243. The second selector 243 selects the output of the second AND circuit 242 depending on the high-level signal.

The second AND circuit 242 (AND 242) receives the signal level retained by the second up-edge flip-flop 231 as one input and the signal level retained by the edge adjustment flip-flop 233 as the other input to output a logical product of the both signal levels. The second AND circuit 242 outputs a low-level signal from the time t53 when the both flip-flops acquire the low-level signal. The second selector 243 supplies the low-level signal to the preceding level retaining flip-flop 250 and the EXOR circuit 260.

The preceding level retaining flip-flop 250 acquires and retains the low-level signal at a rising edge time t55 of the receiving clock signal RC. The preceding level retaining flip-flop 250 supplies a high-level signal to the EXOR circuit 260 until the time t55 and supplies the low-level signal to the EXOR circuit 260 after the time t55.

As a result, the signal level (low) from the second AND circuit 242 is different from the signal level (high) from the preceding level retaining flip-flop 250 only between the times t53 and t55. Therefore, the EXOR circuit 260 generates and outputs the receiving control signal RP having a signal level set to high only between the times t53 and t55. The period between the times t33 and t55 is a period corresponding to one cycle of the receiving clock signal RC.

As a result, a period within 1.5 cycles of the receiving clock signal RC elapses after the time t50 when the receiving part 200 receives the transmission signal LC from the sending part 100 until the time t53 when the receiving part 200 starts output of the receiving control signal RP.

The sixth pattern indicates the waveforms when a time t61 of the level inversion of the transmission signal LC from low to high is identical or substantially identical to the rising edge time t61 of the receiving clock signal RC. Although the first up-edge flip-flop 211 (F/F(P) 211) attempts to acquire and retain the low-level transmission signal LC at the rising edge time t61 of the receiving clock signal RC in this case, an oscillation phenomenon occurs since the acquisition timing overlaps the timing of the level change. Shaded portions of FIG. 9 indicate the period while the oscillation phenomenon occurs (times t61 to t63). On the other hand, the first down-edge flip-flop 212 (F/F(N) 212) acquires and retains the low-level transmission signal LC at the falling edge time t62 of the receiving clock signal RC.

The first selector 223 selects the output of the first AND circuit 222 depending on the high-level signal from the preceding level retaining part 250 as is the case with the fifth pattern. The first AND circuit 222 (AND 222) receives the signal level retained by the first up-edge flip-flop 211 or the signal level of the oscillation state as one input and the signal level retained by the first down-edge flip-flop 212 as the other input to output a logical product of the both signal levels. The first AND circuit 222 outputs a low-level signal by the time t62 at the latest. The first selector 223 supplies the low-level signal to the second up-edge flip-flop 231 and the second down-edge flip-flop 232.

The second up-edge flip-flop 231 (F/F(P) 231) acquires and retains the low-level signal from the first selector 223 at the rising edge time t63 of the receiving clock signal RC. The second down-edge flip-flop 232 (F/F(N) 232) acquires and retains the low-level signal from the first selector 223 at the falling edge time t62 or t64 of the receiving clock signal RC. The edge adjustment flip-flop 233 (F/F(P) 233) acquires and retains the low-level signal from the second down-edge flip-flop 232 at the rising edge time t63 or t65 of the receiving clock signal RC.

The second selector 243 selects the output of the second AND circuit 242 depending on the high-level signal from the preceding level retaining part 250 as is the case with the fifth pattern. The second AND circuit 242 (AND 242) receives the signal level retained by the second up-edge flip-flop 231 as one input and the signal level retained by the edge adjustment flip-flop 233 as the other input to output a logical sum of the both signal levels. The second AND circuit 242 outputs a high-level signal from the earlier acquisition time t63 of the times t63 and t65 when the both flip-flops acquire the high-level signals. The second selector 243 supplies the low-level signal to the preceding level retaining flip-flop 250 and the EXOR circuit 260.

The preceding level retaining flip-flop 250 acquires and retains the low-level signal at a rising edge time t65 of the receiving clock signal RC. The preceding level retaining flip-flop 250 supplies a high-level signal to the EXOR circuit 260 until the time t65 and supplies the low-level signal to the EXOR circuit 260 after the time t65.

As a result, the signal level (low) from the second AND circuit 242 is different from the signal level (high) from the preceding level retaining flip-flop 250 only between the times t63 and t65. Therefore, the EXOR circuit 260 generates and outputs the receiving control signal RP having a signal level set to low only between the times t63 and t65. The period between the times t63 and t65 is a period corresponding to one cycle of the receiving clock signal RC.

As a result, a period within one cycle of the receiving clock signal RC elapses after the time t61 when the receiving part 200 receives the transmission signal LC from the sending part 100 until the time t63 when the receiving part 200 starts output of the receiving control signal RP.

The seventh pattern indicates the waveforms when the level of the transmission signal LC is inverted from high to low at a time t70 that is earlier than a falling edge time t71 of the receiving clock signal RC. In this case, the first up-edge flip-flop 211 (F/F(P) 211) acquires and retains the low-level transmission signal LC at a rising edge time t72 of the receiving clock signal RC. The first down-edge flip-flop 212 (F/F (N) 212) acquires and retains the low-level transmission signal LC at the falling edge time t71 of the receiving clock signal RC.

The first selector 223 selects the output of the first AND circuit 222 depending on the high-level signal from the preceding level retaining part 250 as is the case with the fifth pattern. The first AND circuit 222 (AND 222) receives the signal level retained by the first up-edge flip-flop 211 as one input and the signal level retained by the first down-edge flip-flop 212 as the other input to output a logical product of the both signal levels. The first AND circuit 222 outputs a low-level signal at the earlier acquisition time t71 of the times t71 and t72 when the both flip-flops acquire the low-level signals. The first selector 223 supplies the low-level signal to the second up-edge flip-flop 231 and the second down-edge flip-flop 232.

The second up-edge flip-flop 231 (F/F(P) 231) acquires and retains the low-level signal from the first selector 223 at the rising edge time t72 of the receiving clock signal RC. The second down-edge flip-flop 232 (F/F(N) 232) acquires and retains the low-level signal from the first selector 223 at a falling edge time t73 of the receiving clock signal RC. The edge adjustment flip-flop 233 (F/F(P) 233) acquires and retains the low-level signal from the second down-edge flip-flop 232 at a rising edge time t74 of the receiving clock signal RC.

The second selector 243 selects the output of the second AND circuit 242 depending on the high-level signal from the preceding level retaining part 250 as is the case with the fifth pattern. The second AND circuit 242 (AND 242) receives the signal level retained by the second up-edge flip-flop 231 as one input and the signal level retained by the edge adjustment flip-flop 233 as the other input to output a logical product of the both signal levels. The second AND circuit 242 outputs a low-level signal from the earlier acquisition time t72 of the times t72 and t74 when the both flip-flops acquire the low-level signals. The second selector 243 supplies the low-level signal to the preceding level retaining flip-flop 250 and the EXOR circuit 260.

The preceding level retaining flip-flop 250 acquires and retains the low-level signal at the rising edge time t74 of the receiving clock signal RC. The preceding level retaining flip-flop 250 supplies the high-level signal to the EXOR circuit 260 until the time t74 and supplies the low-level signal to the EXOR circuit 260 after the time t74.

As a result, the signal level (low) from the second AND circuit 242 is different from the signal level (high) from the preceding level retaining flip-flop 250 only between the times t72 and t74. Therefore, the EXOR circuit 260 generates and outputs the receiving control signal RP having a signal level set to high only between the times t72 and t74. The period between the times t72 and t74 is a period corresponding to one cycle of the receiving clock signal RC.

As a result, a period within one cycle of the receiving clock signal RC elapses after the time t70 when the receiving part 200 receives the transmission signal LC from the sending part 100 until the time t72 when the receiving part 200 starts output of the receiving control signal RP.

The eighth pattern indicates the waveforms when a time t81 of the level inversion of the transmission signal LC from high to low is identical or substantially identical to the falling edge time t81 of the receiving clock signal RC. In this case, the first up-edge flip-flop 211 (F/F(P) 211) acquires and retains the low-level transmission signal LC at a rising edge time t82 of the receiving clock signal RC. On the other hand, although the first down-edge flip-flop 212 (F/F(N) 212) attempts to acquire and retain the low-level transmission signal LC at the rising edge time t81 of the receiving clock signal RC, an oscillation phenomenon occurs since the acquisition timing overlaps the timing of the level change. Shaded portions of FIG. 9 indicate the period while the oscillation phenomenon occurs (times t81 to t83).

The first selector 223 selects the output of the first AND circuit 222 depending on the high-level signal from the preceding level retaining part 250 as is the case with the fifth pattern. The first AND circuit 222 (AND 222) receives the signal level retained by the first up-edge flip-flop 211 as one input and the signal level retained by the first down-edge flip-flop 212 or the signal level of the oscillation state as the other input to output a logical product of the both signal levels. The first AND circuit 222 outputs a low-level signal by the time t82 at the latest. The first selector 223 supplies the low-level signal to the second up-edge flip-flop 231 and the second down-edge flip-flop 232.

The second up-edge flip-flop 231 (F/F(P) 231) acquires and retains the low-level signal from the first selector 223 at the rising edge time 82 or t84 of the receiving clock signal RC. The second down-edge flip-flop 232 (F/F(N) 232) acquires and retains the low-level signal from the first selector 223 at the falling edge time t83 of the receiving clock signal RC. The edge adjustment flip-flop 233 (F/F(P) 233) acquires and retains the low-level signal from the second down-edge flip-flop 232 at the rising edge time t84 of the receiving clock signal RC.

The second selector 243 selects the output of the second AND circuit 242 depending on the high-level signal from the preceding level retaining part 250 as is the case with the fifth pattern. The second AND circuit 242 (AND 242) receives the signal level retained by the second up-edge flip-flop 231 as one input and the signal level retained by the edge adjustment flip-flop 233 as the other input to output a logical sum of the both signal levels. The second AND circuit 242 outputs a low-level signal from the time t82 or t84 when the both flip-flops acquire the low-level signals. The second selector 243 supplies the low-level signal to the preceding level retaining flip-flop 250 and the EXOR circuit 260.

The preceding level retaining flip-flop 250 acquires and retains the low-level signal at the rising edge time t84 or t86 of the receiving clock signal RC. The preceding level retaining flip-flop 250 supplies a high-level signal to the EXOR circuit 260 until the time t84 or t86 and supplies the low-level signal to the EXOR circuit 260 after the time t84 or t86.

As a result, the signal level (low or high) from the second AND circuit 242 is different from the signal level (high or low) from the preceding level retaining flip-flop 250 only between the times t82 and t84 or the times t84 and t86. Therefore, the EXOR circuit 260 generates and outputs the receiving control signal RP having a signal level set to high only between the times t82 and t84 or the times t84 and t86. The period between the times t82 and t84 or the times t84 and t86 is a period corresponding to one cycle of the receiving clock signal RC.

As a result, a period within 0.5 or 1.5 cycles of the receiving clock signal RC elapses after the time t81 when the receiving part 200 receives the transmission signal LC from the sending part 100 until the time t82 of t84 when the receiving part 200 starts output of the receiving control signal RP.

As described with the first to eight patterns, the relay part (consisting of the first level retaining part 210, the first selecting part 220, the second level retaining part 230, and the second selecting part 240) retains the signal level immediately after the times of changes in level of the transmission signal LC from low to high (t10, t21, t30, t41, t50, t61, t70, and t81) (at the times of completion of the changes) and outputs the signal level immediately after the changes of the transmission signal LC by a delay amount (t41 to t44 and t81 to t84) corresponding to 1.5 cycles of the receiving clock RC from the times of the changes at the latest. The third signal generating part (consisting of the preceding level retaining part 250 and the EXOR circuit 260) generates and outputs the receiving control signal RP having a pulse width corresponding to the cycle of the receiving clock RC based on the changes in output of the relaying part.

As a result, even under the conditions with the phase differences between the receiving clock signal RC and the transmission signal LC and the changes in level of the transmission signal LC from high to low and from low to high, the receiving part 200 can receive the transmission signal LC from the sending part 100 to output the receiving control signal RP corresponding to one cycle of the receiving clock signal RC. The delay time can be reduced after the receiving part 200 receives the transmission signal LC until the receiving control signal RP is output.

As described above, according to the transmission of the embodiment, a sending apparatus sends to a receiving apparatus a transmission signal having a signal level that is inverted in response to an input of a pulse signal having a width corresponding to a cycle of a sending clock. A receiving apparatus generates a pulse signal having a width corresponding to a period of a receiving clock in response to the level inversion of the transmission signal. In this way, by converting the pulse signal into the transmission signal represented by the level inversion before transmission and reception, i.e., instead of using a pulse having a narrow time width, by transmitting information after conversion into a level signal inverted at the rising edge or the falling edge of the pulse, the receiving apparatus can correctly receive the signal even when the frequency of the sending operation clock is different from the frequency of the receiving operation clock. When the sending apparatus sends a signal, the receiving apparatus always receives a signal and does not behave as if the signal is erroneously received more than once.

If the level of the transmission signal is inverted, the receiving apparatus acquires the signal level in synchronization with each of the up edge and the down edge of the receiving operation clock. Therefore, even when the timing of change in the rising edge/falling edge of the receiving operation clock overlaps the timing of change in the signal level of the transmission signal, the signal level can correctly be acquired at least at one edge of the up edge and the down edge without the oscillation phenomenon.

The transmission apparatus of the embodiment uses different subsequent processes for suppressing a delay of a control signal between the case that the transmission signal changes from high to low and the case that the transmission signal changes from low to high. A process to be executed is selected for either a logical sum or a logical product of the signal level acquired at the up edge of the receiving operation clock and the signal level acquired at the down edge. The selection is enabled by the receiving apparatus retaining the current signal level of the transmission signal from the sending apparatus.

This utilizes the ability of the receiving apparatus to forecast whether the signal level of the transmission signal changes to high or low at the next time by retaining the preceding signal level of the transmission signal. One signal level (either the signal level acquired at the rising edge timing or the signal level acquired at the falling edge timing) is selected that first changes to the next expected direction (i.e., the high-level direction or the low-level direction). As a result, when the level of the transmission signal is inverted, a process to be executed can appropriately be selected for either a logical sum or a logical product, thereby suppressing a delay of the control signal output from the receiving apparatus.

If a conventional metastability measure circuit consisting of two stages of flip-flops is used for the receiving FPGA having a lower operation clock frequency, a delay of two cycles of the operation clock is generated between the reception and output of the control signal by the FPGA, increasing the delay of the control signal within the receiving apparatus. In contrast, the transmission apparatus of the embodiment can suppress the delay to 0.5 cycles of the receiving operation clock in the faster case and to 1.5 cycles at the most.

According to a transmission apparatus, a signal sending apparatus, a signal receiving apparatus, a transmission method, a signal sending method, and a signal receiving method of the embodiment, when sending and receiving apparatuses having different operation clock frequencies send/receive a signal representative of, for example, control information, a problem of metastability can be solved and a delay of the control signal can be suppressed.

This application is based on Japanese Patent Application No. 2009-249194 which is herein incorporated by reference.

What is claimed is:

1. A transmission apparatus transmitting a signal, comprising:

a transmission signal generating part configured to operate in synchronization with a first clock having a first period to output a transmission signal having a signal level that is changed in response to an input of a first pulse signal; and a second pulse generating part configured to operate in synchronization with a second clock having a second period to output a second pulse signal corresponding to the second period in response to changing of a signal level of the transmission signal;

wherein the second pulse generating part includes a relaying part configured to retain the transmission signal based on a change in signal level at a signal level immediately after the change, the relaying part outputting the signal level immediately after the change within a predetermined delay amount from the time of the change, and a third signal generating part configured to generate and output the second pulse signal corresponding to the second period based on a change in output of the relaying part.

2. The transmission apparatus of claim 1, wherein the transmission signal generating part includes a first signal generating part that inverts a signal level of the transmission signal in synchronization with a rising edge of the first clock after the input of the first pulse signal, and a second signal generating part that inverts a signal level of the transmission signal in synchronization with the input of the first pulse signal.

3. The transmission apparatus of claim 2, wherein the transmission signal generating part further includes an output selecting part that selects one of an output of the first signal generating part and an output of the second signal generating part.

4. The transmission apparatus of claim 1, wherein the relaying part includes a first level retaining part configured to retain a signal level of the transmission signal at a rising edge of the second clock as well as at a falling edge of the second clock, a first selecting part configured to select and outputs one signal level changing first to a direction expected to be changed next out of two signal levels retained by the first level retaining part, a second level retaining part configured to retain an output of the first selecting part at a rising edge of the second clock as well as at a falling edge of the second clock, and a second selecting part configured to select and outputs one signal level changing first to a direction expected to be changed next out of two signal levels retained by the second level retaining part.

5. The transmission apparatus of claim 4, wherein the third signal generating part includes a preceding level retaining part configured to retain an output of the second selecting part at a rising edge of the second clock, and an EXOR circuit part configured to input the output of the second selecting part and an output of the preceding level retaining part to output an exclusive logical sum of the two outputs as the second pulse signal.

6. The transmission apparatus of claim 5, wherein
each of the first selecting part and the second selecting part is configured to select one of the two signal levels based on a signal level retained by the preceding level retaining part.

7. The transmission apparatus of claim 4, wherein
each of the first selecting part and the second selecting part is configured to select one signal level changing first to a direction expected to be changed next based on a signal level output from the second selecting part.

8. A signal receiving apparatus operating in synchronization with a clock having a predetermined period to receive a transmission signal, comprising:
a first level retaining part that retains a signal level of the transmission signal at a rising edge of the clock as well as at a falling edge of the clock;
a first selecting part that selects and outputs one signal level changing first to a direction expected to be changed next out of two signal levels retained by the first level retaining part;
a second level retaining part that retains an output of the first selecting part at a rising edge of the clock as well as at a falling edge of the clock;
a second selecting part that selects and outputs one signal level changing first to a direction expected to be changed next out of two signal levels retained by the second level retaining part;
a preceding level retaining part that retains an output of the second selecting part at a rising edge of the second clock; and
an EXOR circuit part that inputs the output of the second selecting part and an output of the preceding level retaining part to generate and output a pulse signal from an exclusive logical sum of the two outputs.

9. A transmission method of transmitting a signal, comprising:
using a transmission signal generating part to generate a transmission signal in synchronization with a first clock having a first period, the transmission signal having a signal level that is changed in response to an input of a first pulse signal; and
using a second pulse generating part to generate a second pulse signal in synchronization with a second clock having a second period, the second pulse signal corresponding to the second period in response to changing of a signal level of the transmission signal;
wherein the receiving step includes
a relaying step of retaining the transmission signal based on a change in signal level at a signal level immediately after the change and outputting the signal level immediately after the change within a predetermined delay amount from the time of the change, and
a third signal generating step of generating and outputting the second pulse signal corresponding to the second period from an output at the relaying step.

10. The transmission method of claim 9, wherein
generating a transmission signal includes
a first signal generating step of inverting a signal level of the transmission signal in synchronization with a rising edge of the first clock after the input of the first pulse signal, and
a second signal generating step of inverting a signal level of the transmission signal in synchronization with the input of the first pulse signal.

11. The transmission method of claim 10, wherein
generating a transmission signal further includes
an output selecting step of selecting one of an output at the first signal generating step and an output at the second signal generating step.

12. The transmission method of claim 9, wherein
the relaying step includes
a first level retaining step of retaining a signal level of the transmission signal at a rising edge of the second clock as well as at a falling edge of the second clock,
a first selecting step of selecting and outputting one signal level changing first to a direction expected to be changed next out of two signal levels retained at the first level retaining step,
a second level retaining step of retaining an output at the first selecting step at a rising edge of the second clock as well as at a falling edge of the second clock, and
a second selecting step of selecting and outputting one signal level changing first to a direction expected to be changed next out of two signal levels retained at the second level retaining step.

13. The transmission method of claim 12, wherein
the third signal generating step includes
a preceding level retaining step of retaining an output at the second selecting step at a rising edge of the second clock, and
an EXOR step of inputting the output at the second selecting step and an output at the preceding level retaining step to output an exclusive logical sum of the two outputs as the second pulse signal.

14. The transmission method of claim 13, wherein
at each of the first selecting step and the second selecting step, one of the two signal levels is selected based on a signal level retained at the preceding level retaining step.

15. The transmission method of claim 12, wherein
at each of the first selecting step and the second selecting step, one signal level is selected that changes first to a direction expected to be changed next based on a signal level output at the second selecting step.

16. A signal receiving method performed by a signal receiving apparatus, the method being directed to receiving a transmission signal in synchronization with a clock having a predetermined period, comprising:
utilizing a first level retaining part to perform a first level retaining step of retaining a signal level of the transmission signal at a rising edge of the clock as well as at a falling edge of the clock;
utilizing a first selecting part to perform a first selecting step of selecting and outputting one signal level changing first to a direction expected to be changed next out of two signal levels retained at the first level retaining step;
utilizing a second level retaining part to perform a second level retaining step of retaining an output at the first selecting step at a rising edge of the clock as well as at a falling edge of the clock;
utilizing a second selecting part to perform a second selecting step of selecting and outputting one signal level changing first to a direction expected to be changed next out of two signal levels retained at the second level retaining step;
utilizing a preceding level retaining part to perform a preceding level retaining step of retaining an output at the second selecting step at a rising edge of the second clock; and
utilizing an EXOR circuit part to perform an EXOR step of inputting the output at the second selecting step and an output at the preceding level retaining step to generate and output a pulse signal from an exclusive logical sum of the two outputs.

* * * * *